United States Patent Office 3,485,801
Patented Dec. 23, 1969

3,485,801
METHOD FOR THE PREPARATION OF LINEAR POLYESTERS
Giacomo Cerutti, Gozzano, Italy, assignor to Bemberg S.p.A., Milan, Italy, a company of Italy
No Drawing. Filed Oct. 9, 1967, Ser. No. 673,913
Claims priority, application Italy, Oct. 12, 1966, 781,965
Int. Cl. C08g *17/015*
U.S. Cl. 260—75    7 Claims

ABSTRACT OF THE DISCLOSURE

A method for the manufacture of polymethylene terephthalates is disclosed, in which the polycondensation catalyst is a compound obtained by reacting an alkali metal salt of a p-(p-dialkylamino phenylazo) benzene sulphonic acid with a soluble salt of a metal selected from the group consisting of Sb, Pb, Sn, Co, Ni, Mn, said catalyst being used in solution at the outset of the polymerization process.

The advantages are: shorter reaction times, lesser catalyst amounts and improved end products.

---

This invention relates to a method for the production of polymethylene terephthalates having a high degree of polymerization.

Polymethylene terephthalate having a high degree of polymerization are, as is known, linear polyesters, which are adapted to be converted into filaments, tapes, films and the like. Among these linear polyesters, polyethylene terephthalate is the most widely known. The method which is most currently adopted for the preparation of the latter polymer comprises a stage of transesterification between ethylene glycol and dimethyl terephthalate, in which bis-(2-hydroxyethyl)-terephthalate is formed, and a polycondensation stage, in which bis-(2-hydroxyethyl)-terephthalate is polymerized to give polyethylene terephthalate. Ethylene glycol can also be directly reacted with terephthalic acid, whereby bis-(2-hydroxyethyl)-terephthalate is again formed, the latter being subsequently polymerized to polyethylene terephthalate.

To prepare linear polyesters within a reasonably short time, it is necessary to resort to catalysts. A number of catalysts have been disclosed heretofore, which are capable of accelerating the reaction velocity of the transesterification stage (or, alternatively, of direct esterification), and of the polycondensation stage, respectively. It is preferred, as a rule, to resort to a catalyst mixture, one of its catalysts, at least, having a specific catalytic action for the transesterification stage (or, as an alternative, of the direct esterification), and at least another catalyst having a specific catalytic activity for the polycondensation stage.

Among the catalysts suggested for the polycondensation stage, several antimony compounds, such as antimony sesquioxide, and also lead oxide have proven to be particularly effective.

The polycondensation catalysts mentioned above, as well as the other conventional ones, are not, however, exempt from a few shortcomings, such as, for example, that of promoting, concurrently with the polycondensation reaction, a few side reactions, which are conducive to a polyester having less valuable properties from the point of view of spinnability, dyeability and colour.

Linear polyesters, prepared with the conventional polycondensation catalysts, have, in addition, a certain degree of instability of the molecular weight during melt-spinning, this fact having a detrimental bearing on further processing operations on the thread, such as drawing, and also on the final specifications of the thread, such as tensile strength. These advantages can now be overcome to a degree by the inventive method.

An additional advantage afforded by the inventive method is that of considerably shortening the time which is required for completing the polycondensation reaction, as compared with the conventional catalysts.

Also, the amount of catalyst which are necessary for promoting the polycondensation reaction at the desired velocity are smaller, in the inventive method, than those required in those methods in which conventional catalysts are employed. This fact has also a positive consequence on the colour of the produced polymer, in that the latter will be wholly devoid of any yellowish discolouration.

The inventive method comprises a stage of polycondensation of a bis-(hydroxy-alkyl)-terephthalate, prepared beforehand, in the presence of a catalyst consisting in the compound resulting from the reaction between a substance having the general formula:

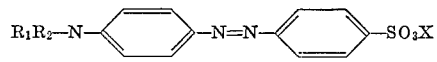

wherein $R_1$ and $R_2$ are alkyl radicals having not more than 10 carbon atoms and X is an alkali metal, with a soluble salt of a metal, selected from the group consisting of antimony, lead, tin, cobalt, nickel, manganese. Among the substances having the general formula reported above, the sodium salt of p-(p-dimethylaminophenylazo) benzene sulphonic acid, best known as methyl orange, has proven to be particularly suited to the ends of the present invention. Among the soluble salts of the metals enumerated above, particularly good results have been obtained with the soluble salts of antimony.

The preparation of the catalyst can be effected by dissolving methyl orange in an appropriate solvent, such as water or ethanol, then adding, to this solution, the solution of a salt of the selected metal or, alternatively, the salt as such directly, should the latter be liquid, and preferably in stoichiometrical amounts. The thusly formed precipitate is collected on a filter, washed with ethanol and dried.

The novel category of catalysts, as prepared with the method described just now, exhibits, as a rule, a fair solubility in ethylene glycol or, alternatively, it originates very stable suspensions, so that the addition of the polycondensation catalyst can be successfully completed at the very outset of the process run, by dissolving (or suspending) the catalysts already in the starting glycol.

An appropriate transesterification catalyst, such as calcium or zinc acetate, is also added at this introductory stage of the process. The amount of polycondensation catalyst, as prepared according to the inventive method, to be added to a glycol, should not exceed, as a rule, 0.1% on a weight basis, as referred to the weight of the terephthalic acid monomer, but preferably should be kept under 0.05% by weight.

The invention will now be illustrated by the following examples, no one of which should be constructed as a limitation.

EXAMPLE 1

An autoclave, equipped with a paddle stirrer, is charged with 100 parts of dimethyl terephthalate, 115 parts of ethylene glycol, in which there was suspended 0.03% by weight of the compound obtained by reacting an alcoholic solution of methyl orange and antimony pentachloride (added in stoichiometrical amounts with respect to methyl orange), and 0.01% by weight of calcium acetate. Both the percentages of the catalysts were referred to the weight of terephthalic acids.

The transesterification reaction was started by gradually heating the autoclave up to a temperature of 210° C., the reaction mass being maintained under a blanket of oxygen-free of nitrogen and with stirring. Heating was continued, at the temperature of 210° C., during two hours until distilling off all the formed methanol. Bis-(2-hydroxyethyl)-terephthalate, formed by this reaction, was then polycondensed by further increasing the temperature up to 270° C. during about one half hour, while concurrently evacuating the autoclave to a vacuum of 2 millimeters of mercury. The temperature of the reaction mass was then maintained at 270° C. during two hours.

Upon completion of polycondensation in this manner, a positive pressure was restored within the autoclave again with nitrogen and the polymer was extruded and cooled.

The polyethylene terephthalate thus obtained had a relative viscosity (measured on a 1% solution in a 50/50 mixture of phenol and tetrachloroethane) of 1.88 and an excellent thermal stability.

EXAMPLE 2

The test of Example 1 was repeated in very much the same conditions, the only difference being that the polycondensation catalyst used was the compound obtained from the reaction between an aqueous solution of methyl orange and an aqueous solution of lead acetate, added in stoichiometrical amounts with respect to methyl orange.

The amount of polycondensation catalyst added was 0.04% by weight, as referred to terephthalic acid.

The polymer extruded from the autoclave, on completion of the polycondensation stage, had a relative viscosity of 1.74 and a good thermal stability.

EXAMPLE 3

The autoclave of Example 1 was charged with 150 parts of terephthalic acid and 100 parts of ethylene glycol, in which was suspended 0.05% by weight (with respect to terephthalic acid) of the compound obtained from the reaction between an alcoholic solution of methyl orange and antimony pentachloride (added in stoichiometrical amounts with respect to methyl orange), and 0.01% by weight (also referred to terephthalic acid) of calcium acetate.

The direct esterification reaction was started, with stirring, at a temperature of 240° C. and under a pressure of 2 atmospheres during 3 hours. After that time, pressure was lowered to 1 atmosphere during 20 mins. so as to complete the distillation of the water formed during the reaction.

On completion of the direct esterification reaction, in which bis-(2-hydroxyethyl)-terephthalate was formed, the temperature was raised to 250° C. whereas the pressure was gradually reduced down to 2 mms. of mercury. After heating at 270° C. during 3 hours, with continuous stirring, the reaction was completed and the formed polymer was extruded from the autoclave by compression with nitrogen.

The polymer had a relative viscosity of 1.91 and an excellent thermal stability.

EXAMPLE 4

A test was performed as in Example 3, the only difference being that the polycondensation catalyst used was 0.008% by weight of the compound obtained from the reaction between an aqueous solution of methyl orange and an aqueous solution of nickel sulphate, added in stoichiometrical amounts with respect to methyl orange.

The polymer extruded from the autoclave had a relative viscosity of 1.79 and was colourless.

What is claimed is:

1. A method for the preparation of polymethylene terephthalates having a high degree of polymerization, in which a polycondensation of a previously formed bis-(hydroxyalkyl)-terephthalate is carried out, characterized in that the catalyst used for the polycondensation reaction is the compound obtained from the reaction of a substance having the general formula:

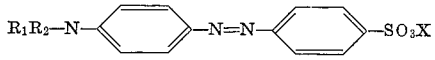

wherein $R_1$ and $R_2$ are alkyl radicals having not more than 10 carbon atoms and X is an alkali metal, with a soluble salt of a metal selected from the group consisting of antimony, lead, tin, cobalt, nickel, manganese.

2. A method according to claim 1, characterized in that the polycondensation catalyst used is the compound obtained from the reaction between methyl orange and an antimony salt.

3. A method according to claim 1 characterized in that the polycondensation catalyst is added as dissolved in the starting glycol.

4. A method according to claim 1 characterized in that the polycondensation catalyst is added in an amount, as referred to terephthalic acid, which does not exceed 0.1% by weight.

5. A method according to claim 2 characterized in that the polycondensation catalyst is added as dissolved in the starting glycol.

6. A method according to claim 2 characterized in that the polycondensation catalyst is added in an amount, as referred to terephthalic acid, which does not exceed 0.1% by weight.

7. A method according to claim 3 characterized in that the polycondensation catalyst is added in an amount, as referred to terephthalic acid, which does not exceed 0.1% by weight.

No references cited.

WILLIAM H. SHORT, Primary Examiner

M. GOLDSTEIN, Assistant Examiner